United States Patent [19]

Meunier et al.

[11] Patent Number: 5,013,580
[45] Date of Patent: May 7, 1991

[54] VIDEO RECORDING/PLAY-BACK HEAD, METHOD FOR MAKING IT AND APPARATUS APPLYING SAID METHOD

[75] Inventors: Paul-Louis Meunier, Paris; Jean-Marie Mackowski, Villeurbanne; Jean-Luc Rolland, Paris, all of France

[73] Assignee: Thomson-CSF, Paris, France

[21] Appl. No.: 262,718

[22] Filed: Oct. 26, 1988

[30] Foreign Application Priority Data

Oct. 27, 1987 [FR] France ............................. 87 14819

[51] Int. Cl.⁵ .......................... B05D 3/06; C23C 14/00
[52] U.S. Cl. ........................................ 427/39; 427/48; 204/192.16
[58] Field of Search ............................. 427/39, 48, 38; 204/192.16

[56] References Cited

U.S. PATENT DOCUMENTS

| | | |
|---|---|---|
| 3,614,831 | 10/1971 | Grundtner et al. |
| 4,382,100 | 5/1983 | Holland ............................. 427/39 |
| 4,504,519 | 3/1985 | Zelez ............................. 427/39 |
| 4,612,207 | 9/1986 | Jansen ............................. 427/39 |
| 4,663,183 | 5/1987 | Ovshinsky et al. ............................. 427/39 |
| 4,676,195 | 6/1987 | Yasui et al. |
| 4,702,934 | 10/1987 | Ishihara et al. ............................. 427/39 |
| 4,713,288 | 12/1987 | Kokaku et al. ............................. 427/39 |
| 4,725,345 | 2/1988 | Sakamoto et al. ............................. 427/39 |

FOREIGN PATENT DOCUMENTS

| | | | |
|---|---|---|---|
| 0002712 | 7/1979 | European Pat. Off. ........ 204/192.16 |
| 0123826 | 11/1984 | European Pat. Off. . |
| 0030124 | 2/1982 | Japan ............................. 204/192.16 |
| 0019472 | 2/1983 | Japan ............................. 204/192.16 |
| 0029169 | 2/1983 | Japan ............................. 204/192.16 |
| 3028855 | 2/1988 | Japan ............................. 204/192.16 |

OTHER PUBLICATIONS

Patent Abstracts of Japan, vol. 3, No. 5 (E-84), Jan. 18, 1979 & JP 53132322 Magnetic Head, Yasuo Nannichi 11/18/1978.

Patent Abstracts of Japan, vol. 10, No. 241 (P-488[2297] Aug. 20, 1986, Method for Forming Titanium Nitride Film of Magnetic Tape Sliding Member, Motoyasu Momoki 4/12/1986.

Patent Abstracts of Japan, vol. 6, No. 75 (P-114)[953], May 12, 1982 & JP-5712449. Molded Member Having Sliding Surface of Magnetic Tape, Kazuo Nozawa, 1/22/1982.

Primary Examiner—Norman Morgenstern
Assistant Examiner—Marianne Padgett
Attorney, Agent, or Firm—Oblon, Spivak, McClelland, Maier & Neustadt

[57] ABSTRACT

Video recording/play-back heads concerning rotating heads subjected to wear are disclosed. The structure of this head is such that the active part of the magnetic head as well as the drum are coated with a wear-resistant layer.

5 Claims, 2 Drawing Sheets

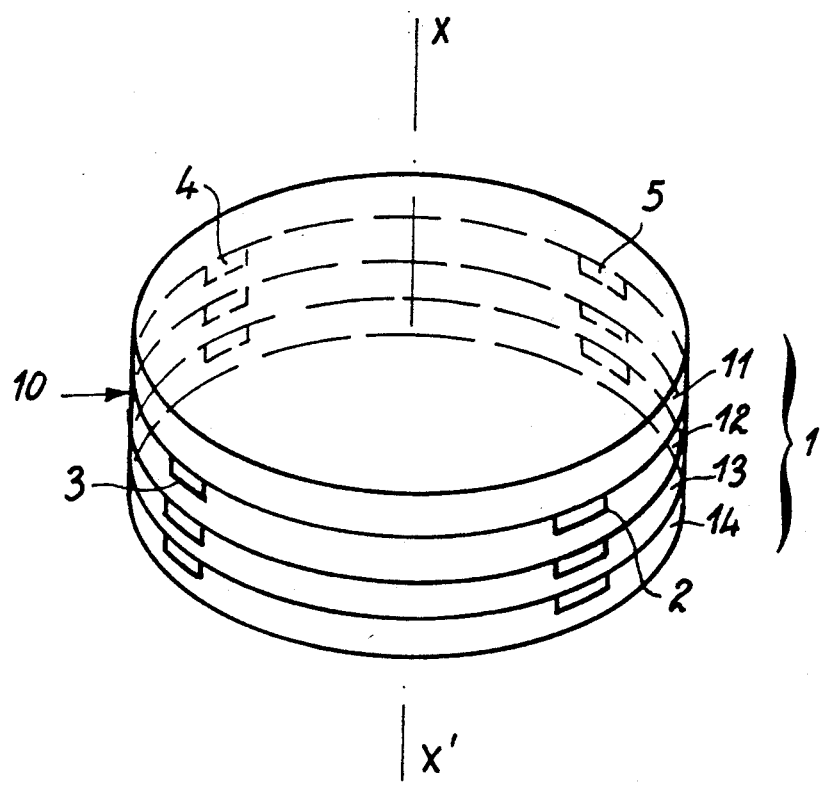
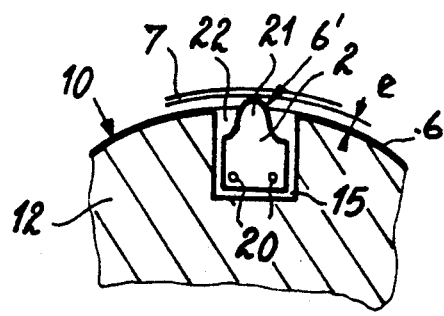

VIDEO RECORDING/PLAY-BACK HEAD, METHOD FOR MAKING IT AND APPARATUS APPLYING SAID METHOD

BACKGROUND OF THE INVENTION

1. Field of the Invention

The invention concerns a video recording/play-back head and, more particularly, a recording head comprising a protective layer against wear due to the magnetic recording tape. It especially concerns a method for making a head of this type as well as an apparatus used to implement this method.

2. Description of the Prior Art

At present, magnetic heads of the type used in domestic video sets (VHS) are subjected to friction from the tape which runs past at a speed of 5 ms$^{-1}$. This produces wear of about 20 micrometers per 2000 hours of use on the substrate of the head and, hence, on the poles. There are at least two of these heads and they are mounted diametrically opposite to each other on a drum with a diameter of a few centimeters. The drum is machined with thin helicoidal grooves (of a depth of 200 micrometers) in order to exert suction on the surface of the tape and so that no film of air can prevent contact between the tape and the head. This drum, and especially the recorded grooves undergo erosion. This erosion produces waste material, such as metallic powder coming from the drum, which may form a powder which is abrasive with respect to the magnetic heads and aggravates the causes of wear in the magnetic heads.

Furthermore, the tape is subjected to a gap in the material, generally a gap between the drum, which is made of aluminium, and the magnetic heads which are made of ferrite. These gaps result in differences in adhesion which may give rise to more accentuated friction on the drum or on the magnetic heads.

Furthermore, the heads are placed in housings provided in the drum. These housings create eddies around the head, thus accentuating differences in adhesion.

The invention provides a solution to prevent the wearing out of the drum and the magnetic head and to eliminate differences in adhesion which may exist between the magnetic tape and the drum, on the one hand, and between the magnetic tape and the magnetic heads, on the other hand.

SUMMARY OF THE INVENTION

The invention therefore concerns a video recording/play-back head comprising a drum made of a non-magnetic material, incorporating several magnetic heads arranged along the periphery of the drum and having their active recording/play-back surface emerging slightly from the external surface of the drum, said head also comprising a layer of a wear resistant material covering the external surface of the drum as well as each active surface of each magnetic head.

The invention also concerns a method for making a video recording/play-back head made by a technique of plasma deposition under an electrical field created radially around the video recording/play-back head, said head being placed within a conductive chamber, the inner wall of which forms an electrode and is carried to a first potential while the external surface of the drum of the recording/play-back head and the magnetic heads are carried to a second potential.

Finally, the invention concerns an apparatus to deposit wear-resistant layers for the video recording/play-back heads applying the above method, said apparatus comprising a plasma chamber comprising at least ore cylindrical electrode carried to a first potential, apertures for the inlet of ionized gases as well as an axial supporting means, carried to a second potential, enabling at least one video recording/play-back head to be held along the axis of the cylindrical electrode and to apply said second potential to it.

BRIEF DESCRIPTION OF THE DRAWINGS

The various objects and features of the invention will appear more clearly from the following description, made by way of example, with reference to the appended figures, of which:

FIG. 1 shows a general view of an embodiment of a video recording/play-back head according to the invention;

FIG. 2 shows a partial section of the head of FIG. 1;

DETAILED DESCRIPTION OF THE INVENTION

Figure 3:
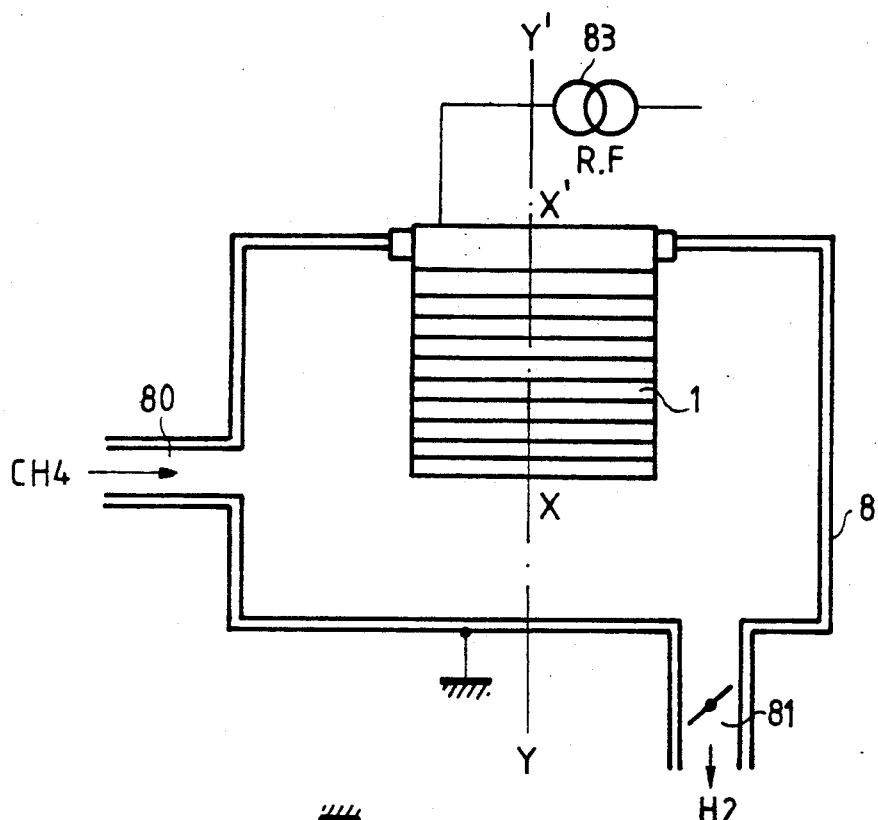
FIGS. 3 and 4 show examples of instruments according to the invention used to make one or more heads of the type shown in FIG. 1.

Referring to FIG. 1, we shall firs&. describe an embodiment of a video recording/play-back head according to the invention.

This head has a drum 1 formed by the assembling, along one and the same axis XX', of several cylindrical plates 11, 12, 13, 14. These plates have magnetic heads such as 2, 3, 4, 5, the active recording surface of which emerges slightly from the cylindrical surface 10 of the drum 1.

As shown in the partial cross-section of FIG. 2, each magnetic head such as 2 is placed in a cavity 15 of a cylindrical plate 12. It is fixed in this cavity by means of screws 20 for example.

The surface 10 of the drum is coated entirely by a layer 16 of an abrasion-resistant material. This abrasion-resistant material also covers the surface of each magnetic head, which emerges from the surface of the drum, in the form of a layer 6'.

The deposition of an abrasion-resistant layer, applied to a recording/play-back head, is a known technique. However, the application of this technique to the entire head provides a different overall structure which yields the following different advantages:

- the absence of wear on the drum and, therefore, of abrasive waste material due to this wearing process, which may increase the wearing out of the heads;
- the homogeneity of the material encountered by the recording support 7, rubbing against the drum and the magnetic heads;
- the fact that the emergence, e in FIG. 2, of the magnetic heads can be reduced, thus enabling a reduction in turbulence that might occur in the zone such as 22 neighboring each magnetic head, it being possible to reduce said emergence, for example, from 20 micrometers to 5 micrometers.

A magnetic recording/play-back head thus described is rortationally symmetrical. This will be used to deposit the layer of abrasion-resistant material. One or more drums 1, provided with their magnetic heads, are placed along an axis XX' in a depositing chamber where they are mounted and oriented.

This deposition chamber may be either a plasma chamber or a chamber for reactive ion sputtering.

FIG. 3 shows a depositing apparatus used to achieve plasma deposition according to the method of the invention.

This apparatus has a cylindrical chamber 8 which acts as the electrode and has an axis YY'.

This chamber has at least one inlet 80 of gas, for example CH$_4$, used for the deposition which is to be made.

Along the axis YY', there are placed a drum 1 or a stack of drums, the axis XX' of which is fixed by means (not shown) along the axis YY'.

A voltage generator 83 (with a frequency of 13.56 MHz for example) is electrically connected to the drum 1 and to the electrode 8. It applies a negative potential, for example, to the drum 1, and a positive potential to the electrode 8.

The chamber has an outlet 81 called a pumping output for hydrogen.

Radial plasma deposition has an advantage as compared with plane plasma deposition, because the capacitance or capacitive factor between the armatures varies by 1/log r instead of 1/r thus enabling deposition with greater energy. In these relationships, r represents the distance between the plane electrodes in the case of a plane plasma deposition or the distance between the surface of a drum and the cylindrical electrode in the case of a radial plasma deposition. The magnetic field fits the shape of the drum and heads, thus creating no local excess voltage (electrostatic peak effect) which causes non-homogeneity in the deposition.

Figure 4:
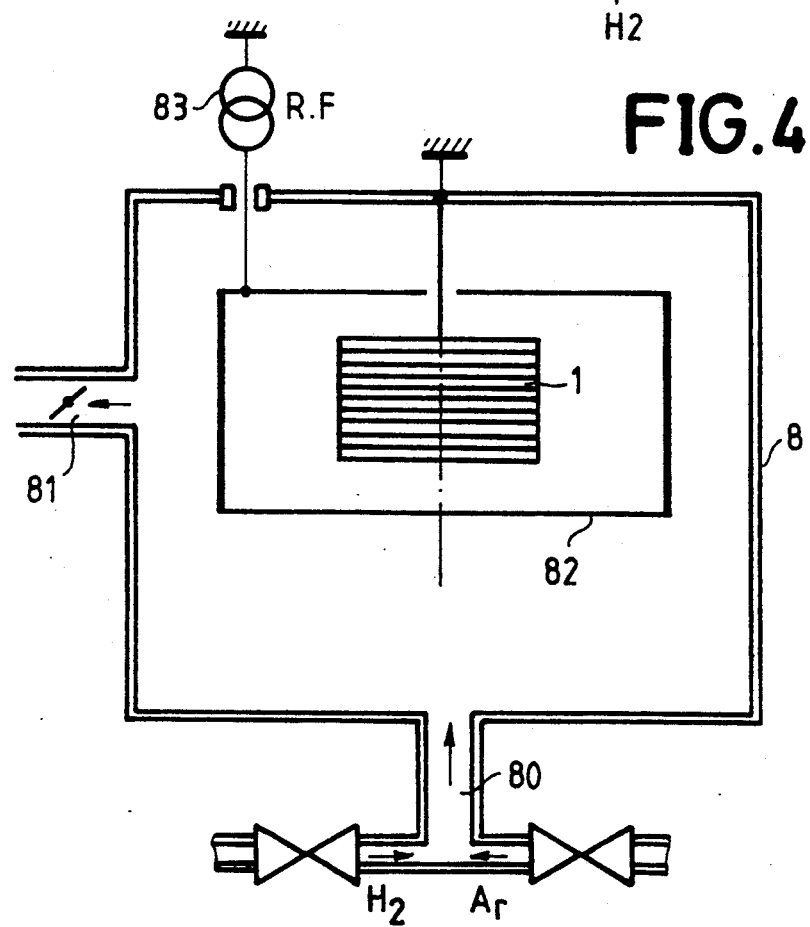

A reactive ionic sputtering apparatus comprises, as shown in FIG. 4, a chamber 8 having an inlet 80 to introduce gases such as hydrogen and argon and an outlet 81 for the pumping of gases. A cylindrical electrode 82, comprising carbon, is carried to a negative potential by an RF generator 83, while the drum 1 to be coated, held by means (not shown) along the axis of the electrode 82, is at the ground potential.

According to the invention, the drum 1 is thus made of an electrically conductive material, or it is lined with a conductive layer.

The method for depositing the abrasion-resistant layer may also be implemented on a rotating drum.

The advantage of the method of the invention is:
the ability to process already mounted heads in situ,
the ability to make a homogeneous coating,
the ability to make a large number of drums owing to the flexibility of the system, and to thus design suitable the flexibility of the system, and to thus design suitable chambers,
the ability to reduce the emergence of the head and to eliminate the grooves around the drum,
the ability to eliminate or reduce the wearing out of the drum, and to manufacture it from a material of a density lower than that of the existing drums, and to thus reduce the difficulties of balancing the mechanical system.

The location of the stacking, the shape of which is close to that of the holocathode makes the plasma deposits very even and lacking in any constraint gradient.

It is quite clear that the above description has been given solely as a non-restrictive example. Other alternatives can be considered without going beyond the scope of the invention. In particular, the digital examples have been given only to illustrate the description.

What is claimed is:

1. A method for making a video recording/play-back head, said head including a drum made of a non-magnetic material with a plurality of magnetic heads being arranged on the periphery of the drum and having their active recording/play-back surface emerging slightly above an external surface of the drum, comprising the steps of:

placing said video recording/play-back head inside a conductive chamber, an internal wall of said chamber forming an electrode to which is applied a first potential voltage;

placing the active recording surface of each magnetic head approximately 5 microns above the external surface of the drum and thereby reducing turbulence created in a zone between the external surface of the drum and the active surface of the magnetic head;

applying a second potential voltage tot he external surface of the drum and said magnetic heads, forming a radial electric field around said video recording/play-back head; and depositing a wear-resistant material on the external surface of the drum and an active surface of each magnetic head.

2. A method according to claim 1, wherein said depositing step comprises radial plasma depositing a wear resistant material over the external surface of the drum, and an active surface of each magnetic head.

3. A method according to claim 1, comprising:
stacking said plurality of drums inside said conductive chamber; and
forming the shape of a holocathode of a plasma deposition system to be the same as the shape of said stacked drums.

4. A method according to claim 1, wherein said depositing step comprises reactive ion sputtering using a cylindrical electrode containing carbon, and applying to said electrode a negative potential voltage while the drum and magnetic heads are held at ground potential.

5. A method for making a video recording/play-back head, said head including a drum made of a non-magnetic material with a plurality of magnetic heads being arranged on the periphery of the drum and having their active recording/play-back surface emerging above an external surface of the drum, comprising the steps of:

placing each active recording surface of each magnetic head approximately 5 microns above the external surface of the drum and thereby reducing turbulence created in a zone between the external surface of the drum and the active surface of the magnetic head is reduced;

placing said video recording/play-back head inside a conductive chamber, and applying to an internal wall of said chamber forming an electrode a first potential voltage;

applying a second potential voltage to the external surface of the drum and said magnetic heads, thereby forming a radial electric field around said video recording/play-back head; and radial plasma depositing a wear-resistant material on the external surface of the drum and an active surface of each magnetic head.

* * * * *